Sept. 18, 1962
C. V. WILLIAMS ET AL
3,054,572
LINE TENSIONING MACHINE
Filed Aug. 10, 1961
4 Sheets-Sheet 1
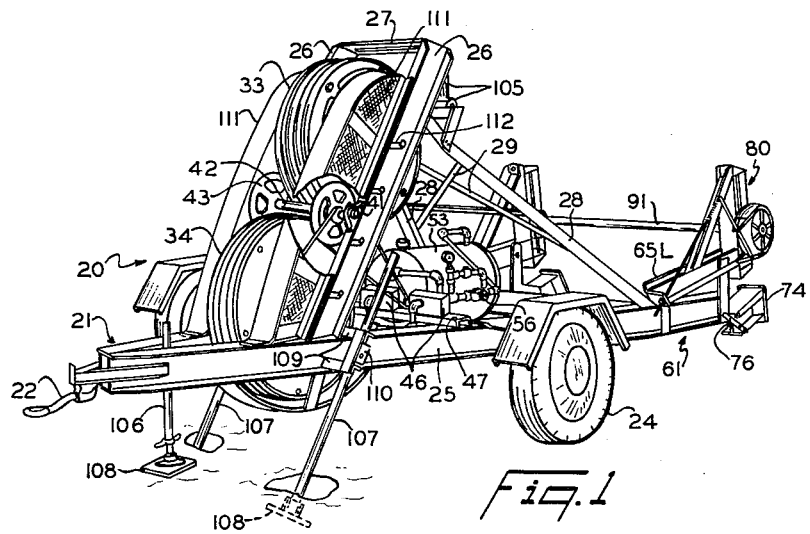
Fig.1
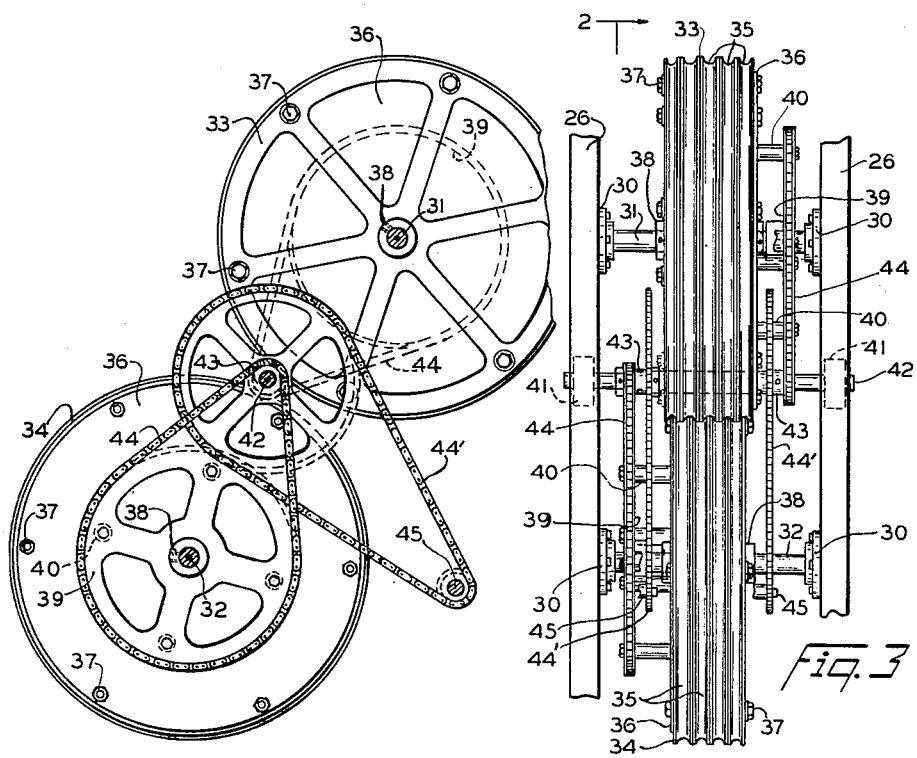
Fig.2
Fig.3
INVENTORS.
CRAIG V. WILLIAMS
CHARLES D. LIPPINCOTT
BY
Atty.

Sept. 18, 1962    C. V. WILLIAMS ET AL    3,054,572
LINE TENSIONING MACHINE
Filed Aug. 10, 1961    4 Sheets-Sheet 2
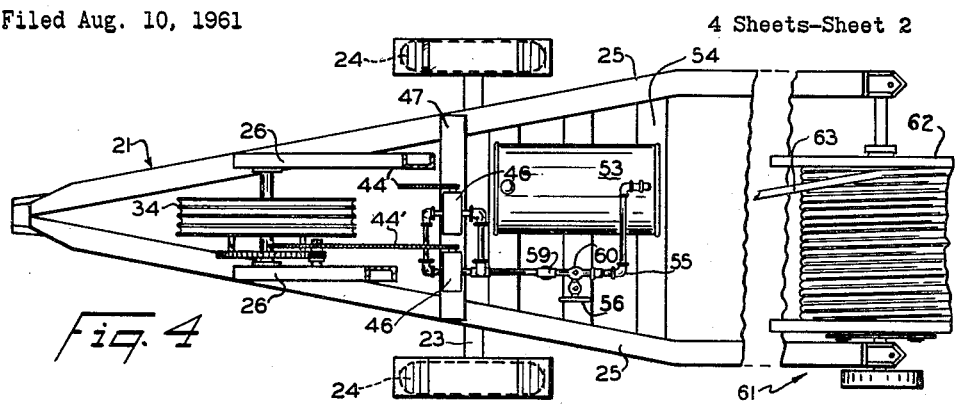
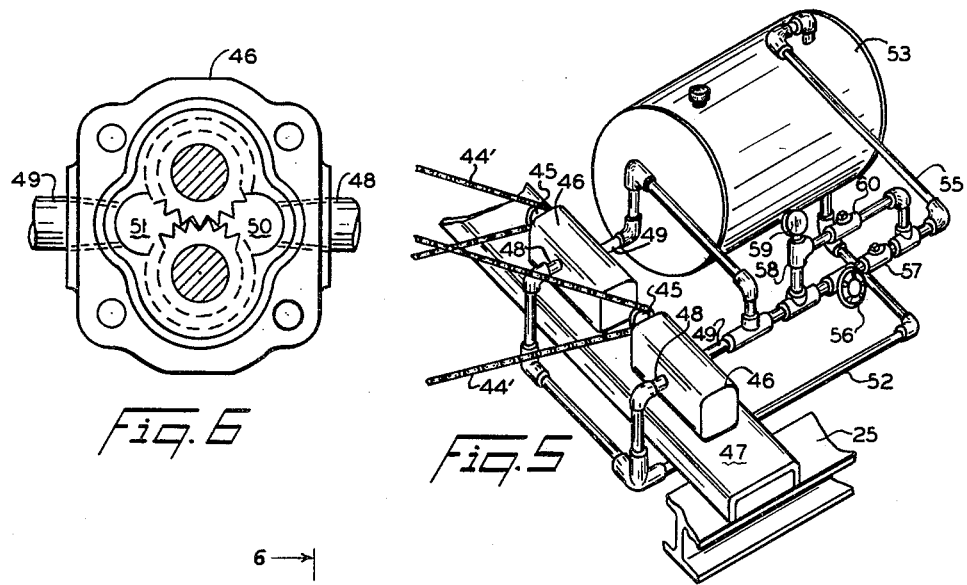
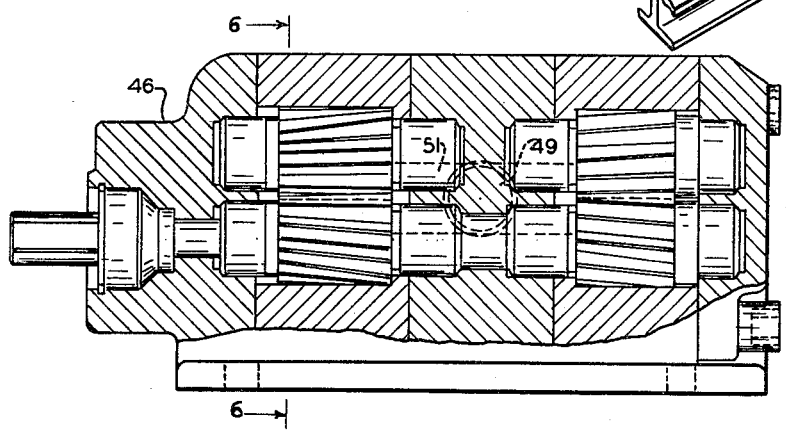
INVENTORS.
CRAIG V. WILLIAMS
CHARLES D. LIPPINCOTT
BY

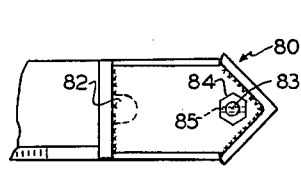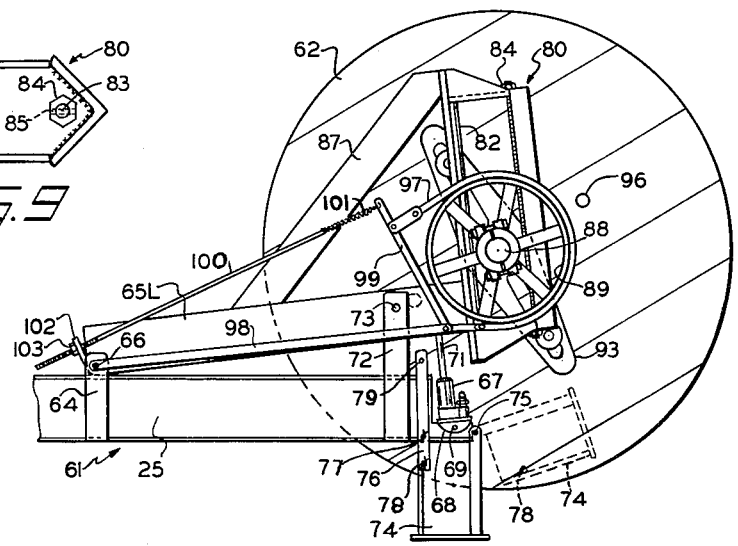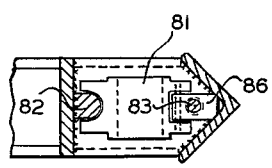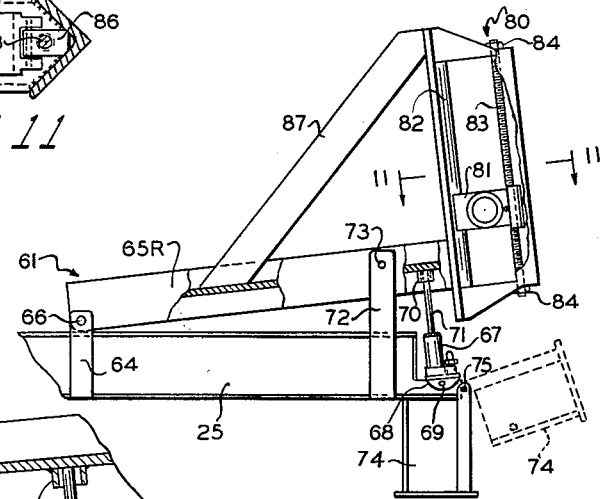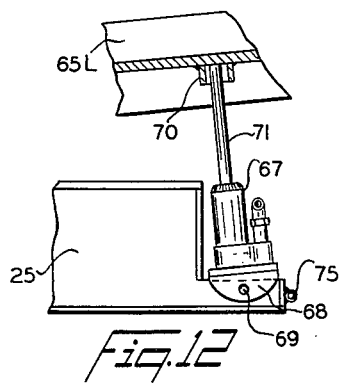

Sept. 18, 1962   C. V. WILLIAMS ET AL   3,054,572
LINE TENSIONING MACHINE
Filed Aug. 10, 1961   4 Sheets-Sheet 4

INVENTORS.
CRAIG V. WILLIAMS
CHARLES D. LIPPINCOTT
BY
Atty.

United States Patent Office 3,054,572
Patented Sept. 18, 1962

3,054,572
LINE TENSIONING MACHINE
Craig V. Williams and Charles D. Lippincott, Fayetteville, N.Y., assignors to Bradley & Williams, Inc., East Syracuse, N.Y., a corporation of New York
Filed Aug. 10, 1961, Ser. No. 130,563
8 Claims. (Cl. 242—86.7)

This invention relates to apparatus for supplying tension to heavy electric transmission cable as it is pulled over the towers on which the cable is normally carried. More particularly, the invention relates to a line tensioning machine having among other features a novel bull wheel construction, an improved braking means, and means for lifting and supporting reels from which the cable is supplied during its installation.

Heavy steel-cored aluminum cable used in high voltage cross-country transmission lines must be carefully installed to prevent injury to the cable since a small scratch may cause considerable corona loss which is uneconomic and may cause interference with communication systems. Installation of such cable is therefore usually accomplished by "tension stringing" in which the cable is pulled over pulleys, anchored at the top of the supporting towers, by means of a winch and steel rope fastened to the leading end of the cable. Brake means are provided at the location where the reels, on which the cable to be installed is wound, are paid out. By paying out the cable under tension while it is pulled over the towers, the cable between the towers is kept off the ground and can be made to clear roadways, other transmission lines and the like.

At the supply or unreeling point, the cable is passed from the reel in a spiral path over a plurality of grooved bull wheels the rotation of which is retarded by the brake mechanism in synchronism with the operation of the winch so that the cable being installed is kept under constant tension as it is drawn over the pulleys on the towers. The winch may be as much as three miles from the supply reel or the towers may be widely spaced, as in river crossings, resulting in tremendous pressure on the bull wheels and requiring supply reels of great weight. The difficulties encountered and the advantages obtained in this type of installation are adequately detailed in U.S. Patents Nos. 2,948,483 and 2,954,702 to G. A. M. Petersen issued Aug. 9, 1960, and Oct. 4, 1960, respectively, and 2,958,478 to G. A. M. Petersen et al. issued Nov. 1, 1960.

Difficulties encountered with equipment heretofore known for providing the braking action to the unreeling cable include rapid deterioration of the bull wheel grooves and excessive concentrated heat generated by the braking mechanism, due to the tremendous tension. Either of these difficulties may result in complete breakdown of the equipment, loss of the cable being installed, and costly delay for repairs to the equipment. Inaccessible terrain or inclement weather at the unreeling location often prevents movement of the cranes needed for conventional equipment to lift the heavy reels into position for unreeling, or special vehicles are required to transport and support the heavy reels and are unable to follow the braking apparatus in rugged terrain.

The principal object of the present invention, accordingly, is to provide a rugged and maneuverable tensioning apparatus for the tension stringing of heavy transmission cables which is easily repairable in the field, which provides means for maintaining high tension on the cable as it is being pulled over the towers without overheating the braking device, which has self contained lifting means for raising loaded cable reels into unreeling position, and which has means for levelly supporting a reel for supply cable to the tensioning means.

Another object of the invention is to provide a tensioning apparatus with bull wheel means for frictionally gripping the cable as it is pulled over the towers, which bull wheel means are easily repairable and replaceable in the field when damaged because of wear.

Still another object of the invention is to provide brake means capable of smoothly retarding the rotation of the bull wheels when the cable is under heavy tension without the concentration of damaging heat and without separate motor means for operating the brake means.

Further objects of the invention are to provide brake means which can be easily, evenly, and precisely regulated by a manual control in synchronization with the cable pulling means, which can be readily locked, and which can be as readily unlocked or freed of the regulating control whenever necessary.

Still further objects of the invention are to provide arbor means on the maneuverable tensioning apparatus for supporting a supply reel for rotation, which arbor means may be adjusted in height for reels of different sizes as they rest on the ground, and which may be levelled; also to provide means on said tensioning device for lifting the supply reels on said arbor means free of the ground, and to provide drag brake means on said arbor means for preventing slack cable from feeding on to the bull wheels which would tend to permit slippage of the cables around the bull wheels.

Other objects and advantages will become apparent from the following description taken in conjunction with the accompanying drawings, in which:

FIGURE 1 is a perspective view of a vehicular mounted tensioning apparatus according to the present invention;

FIGURE 2 is an enlarged fragmentary side elevational view, partly in section on the line 2—2 of FIG. 3, of the bull wheels and parts associated therewith;

FIGURE 3 is a rear elevational view of the parts shown in FIG. 2;

FIGURE 4 is a fragmentary top plan view, partly in section, of a portion of the vehicle of FIG. 1, below the upper bull wheel;

FIGURE 5 is a perspective view on a larger scale of the closed hydraulic system;

FIGURE 6 is an enlarged sectional view on the line 6—6 of FIG. 7;

FIGURE 7 is an enlarged longitudinal vertical section of one of the pumps of FIG. 5;

FIGURE 8 is an enlarged fragmentary left side elevation of the left rear portion of the vehicle of FIG. 1;

FIGURE 9 is an enlarged fragmentary top plan view of the take-up mechanism of FIG. 8;

FIGURE 10 is an enlarged fragmentary left side elevation of the right rear portion of the vehicle of FIG. 1;

FIGURE 11 is an enlarged sectional view on the line 11—11 of FIG. 10;

FIGURE 12 is an enlarged fragmentary detail view of the jack portion of FIG. 8;

Figure 13:
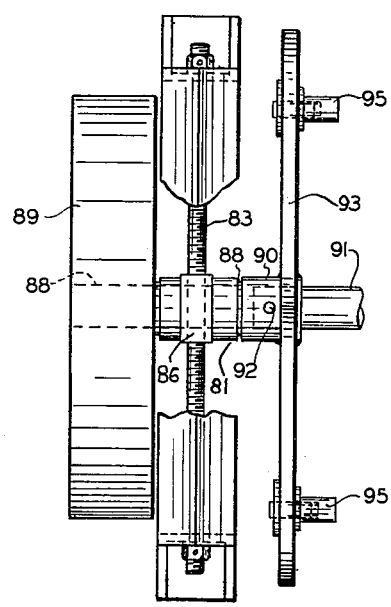
FIGURE 13 is an enlarged fragmentary rear elevational view of a portion of the parts shown in FIG. 8.

Referring now more particularly to FIGURES 1 and 4, the tensioning apparatus or machine 20 is provided with a generally V-shaped (in plan) frame 21 of welded channel construction, the frame having a trailer hitch 22 at the front and being mounted on an axle 23 and wheels 24 for mobility. Near the front, each side member 25 of frame 21 has an upwardly and rearwardly extending bull wheel support member 26 secured thereto. Members 26 are connected at the top by a cross brace 27 and are braced to the rear by braces 28 and 29.

Mounted in journals 30 (FIG. 3) which are bolted to the support members 26 are the upper and lower bull wheel shafts 31 and 32, respectively. Mounted and secured against axial movement on shafts 31 and 32 respectively are the bull wheels 33 and 34.

Each bull wheel is of novel construction and comprises a plurality of separate sheaves 35, preferably of cast aluminum alloy to prevent scarring of the cable. Wheel 33 is provided with five such sheaves and wheel 34 with four sheaves, for reasons which will become apparent. Each wheel is provided with an annular steel disc 36 at one side, the disc for wheel 33 being mounted on the right (FIG. 3) and the disc for wheel 34 on the left, and the sheaves and discs are bolted together by bolts 37 through aligned holes in the felly portions of the sheaves. Collars 38, clamped to shafts 31 and 32 on either side of the bull wheels, maintain the wheels in alignment axially of the shafts.

A sprocket 39 is bolted to the disc 36 of each wheel, spaced therefrom by the tubular spacers 40 as shown. Mounted in journals 41, also carried on support members 26, is an idler shaft 42 which carries a pair of double sprockets 43, each double sprocket comprising a large and small sprocket carried on a common hub. The double sprockets 43 are secured in a conventional manner on the shaft 42 so that they are prevented from axial movement but are independently rotatable thereon, and a chain 44 connects the smaller sprocket of each double sprocket with one of the sprockets 39.

The larger sprocket of each sprocket 43 is connected by a chain 44' to the drive sprocket 45 of one of a pair of hydraulic pumps 46 (FIGS. 4 and 5) mounted on a cross member 47 of frame 21. Adjustable idler sprockets (not shown) may be provided to take up slack in the chains 44 and 44'.

Each pump 46 is of conventional hypoid gear construction and has an inlet 48 and outlet 49. Each pump 46 is a tandem pump having the inlet and outlet sides of each of its individual pumps connected in tandem by the passages 50 and 51, respectively, as best seen in FIGURES 6 and 7.

The pump inlets 48 are connected by suitable piping to an inlet line 52 leading from a hydraulic fluid reservoir 53 which is mounted on suitable flooring 54 (FIG. 4) carried by the frame 21. The outlets 49 are connected by high pressure piping to a pressure line 55 leading back to the reservoir 53.

In the pressure line 55 is a needle valve 56 for regulating the rate of flow from the pumps 46, and just beyond the valve 56 is a normally open shut off valve 57. A bypass line 58 connected in line 55 on either side of the valves 56 and 57 is provided with a pressure gauge 59 and a normally closed shut off valve 60, in that order in the direction of flow.

In back of reservoir 53, the side members 25 of the frame cease to diverge and continue rearwardly parallel to one another as best seen in FIG. 4. The side members 25 are provided with a novel arbor mechanism 61 for lifting and levelly supporting the rotatable reel 62 which bears the supply of cable 63.

Each side member 25 has a pivot support post 64 welded on either side thereof (FIGURES 8 and 10) for hinged connection to a lifting arm 65 of H-beam configuration, the left hand arm being designated 65L and the right hand arm 65R. A pivot pin 66 extends through the posts 64 and both flanges of each arm 65 to secure the arm to frame 21, and a conventional heavy duty hydraulic jack 67 connected to the end of each side member 25 provides means for lifting the rear ends of the arms 65 upward for a limited distance as shown in FIGURES 8 and 10.

The end of each side member 25 is partially cut away, as shown, leaving a portion of the web, and the jacks 67 are provided with spaced depending feet 68 on either side of the web. A pin 69 through feet 68 and the web provides a longitudinally rockable support for the jacks 67. A socket 70 (FIG. 12) is also provided on the web portion of the arms 65 to receive the piston rods 71 of the jacks.

Just forward of the jacks 67, each side member 25 is provided on each side thereof with an upwardly projecting guide bar or locking arm 72, for guiding the lifting arms in their upward and downward travel. A pin 73 through the upper ends of the guide bars 72 and their associated arm 65 serves to hold the latter in elevated position without strain on the jack.

Each frame member 25 is provided with a support leg 74 at the rear end thereof, hingedly connected thereto as at 75. A locking bar 76 (FIG. 8) is connected by a pin 77 to the member 25 and by a pin 78 to the leg 74 to lock the leg in place for supporting a reel. Bar 76 is provided with a third hole 79 for engagement with pin 77 to lock the leg in a rearwardly extending inoperative position for travelling, as shown in FIG. 1 and in broken lines in FIGURES 8 and 10. The pins 77 and 78 are provided with cotter pin holes at their exterior ends for securing the bar 76 in place.

Each lifting arm 65 is provided with a take up frame 80 welded to its rear end for leveling the arbor and adjusting its height when the arms 65 are lowered to their normal position of rest on members 25. Take up frame 80 is of the type normally used for tightening conveyor belts and comprises an arbor shaft journal 81 slidably mounted in the frame 80, guided by a vertical guide rail 82 and adjustable up and down by a vertically disposed screw or worm 83. Nuts 84 are threaded on the screw 83 at either end outside the frame and are locked thereto by pins 85 (FIG. 9) so that the screw may be turned by a conventional wrench. The sliding journal 81 has a nut member 86 secured thereto in threaded engagement with screw 83 as best seen in FIG. 11. The top of each frame 80 is braced by a shoring member 87 extending between the frame and arm 65.

The arbor rotatably supported by the journals 81 is of two piece construction. A stub shaft 88, best seen in FIG. 13, projects from either side of the journal 81 carried by the left side arm 65L and comprises the first part of the arbor. A flat ferruled pulley or drum 89 is secured to the outer end of shaft 88 and the inner end of the shaft is provided with an enlarged socket portion 90 for receiving the shaft 91 which is the other portion of the arbor and which extends across the machine through the journal 81 carried by arm 65R. A pin 92 slipped through aligned holes in socket 90 and arbor shaft 91 may be used to lock the two parts of the arbor together.

Figure 14:
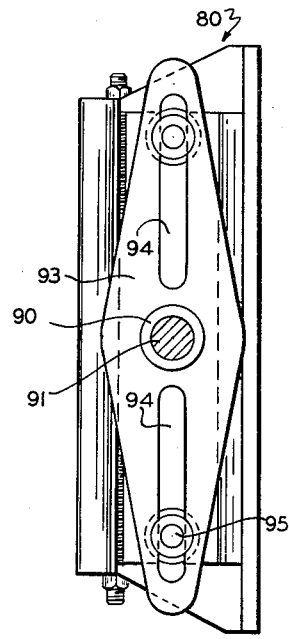
FIGURE 14 is a right side elevation of the parts shown in FIG. 13.

A registry member 93 is welded to the socket 90 and has two radially extending arms having radial slots 94 (FIG. 14) therein. The slots 94 have registry pins 95 slidably mounted therein, the pins projecting axially of the arbor for insertion in the winding holes 96 of a reel 62 such as shown in FIG. 8.

A flexible brake band 97 (FIG. 8) is mounted around the major portion of the perimeter of the drum 89, the lower end of the band being hingedly joined to one end of a brake support lever 98. The other end of lever 98 is pivotally connected to pin 66. The upper end of band 97 is hingedly secured to a brake lever 99 intermediate its ends, and the lower end of lever 99 is pivotally secured to the rear end of lever 98. A brake rod 100 is connected to the upper end of the brake lever 99 by a spring 101 and extends forward through a hole in a stop member 102 welded to the forward end of arm 65L. The forward end of rod 100 is threaded and bears a nut 103 which may be tightened to pull the band 97 against drum 89 to retard the rotation of the arbor 88, 91.

Figure 15:
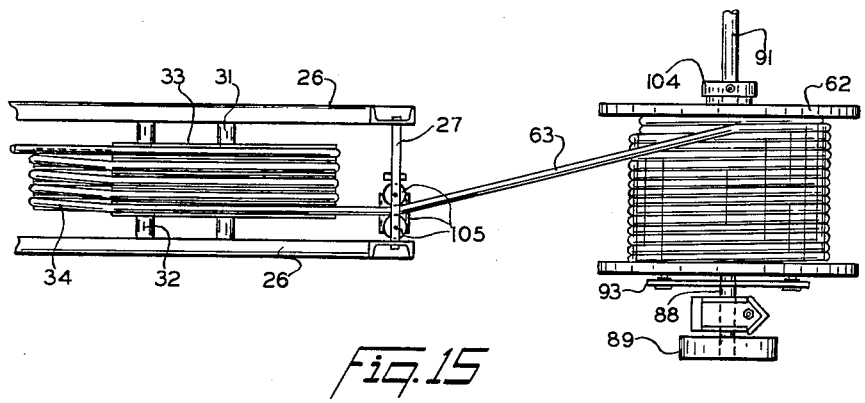
FIGURE 15 is a diagrammatic fragmentary top plan view of a supported reel and the bull wheels of the apparatus of FIG. 1.

A sleeve 104 (FIG. 15) having set screw means for locking engagement with the shaft is provided on the arbor shaft 91 for holding a reel 62 against the registry member 93. Roller means 105 are mounted on suitable support structure secured to the cross brace 27 for guiding the cable 63 from reel 62 to the first sheave groove of the upper bull wheel 33. The rollers 105 are rotatably supported on either side and below cable 63, and are neoprene coated for long wear and to protect the cable.

Referring again to FIGURE 1, a conventional support jack leg 106 is provided for supporting the front end of the frame 21, and two forwardly and downwardly inclined anchor legs 107 are provided, one on each side member 25, just forward of the bull wheels. Legs 106 and 107 are provided with removable feet 108. Legs 107 project downward through holes in outwardly extending brackets 109 welded to side members 25, and a collar 110 with set screw means for securing it to the leg 107 is provided for each leg. Similar means for making the leg both retractable and removable are provided for the leg 106.

Protective guards 111 are provided over chains 44 and 44' and are bolted to the bull wheel support members 26. Steps 112 are also secured to these members to assist operators and maintenance men in their work.

The operation of the tensioning machine 20 will now be described. The device may be towed by means of the hitch 22 by any tracked vehicle or "cat", or the hitch 22 may be reversed above frame 21 for attachment to a truck. No special towing equipment is necessary. The machine is first placed in the desired location headed toward, and about 200 feet from, the first tower on which the cable is to be strung. The last groove of the upper bull wheel 33 is aligned with the tower. Front leg 106 and its foot 108 are then attached, adjusted and locked to support the machine. The towing vehicle may then be unhitched and driven away.

A reel 62 is brought to the sidte by a "cat," lift truck or other vehicle and placed on the ground in back of the arbor mechanism 61 with the leading end of the cable 63 headed toward the bull wheels. Rear legs 74 are then dropped and locked in place with the lock bars 76. The reel is rolled between arbor journals 81 and the journals adjusted vertically so as to be aligned with the arbor hole of the reel by means of a wrench applied to the nuts 84. Arbor shaft 91 is then inserted through the right hand journal 81, sleeve 104, the reel arbor hole, and into socket 90; and pin 92 inserted to lock it there.

The arbor height adjustment mechanism is again adjusted by turning the screws 83 to level the arbor shaft 91 and to take up all slack in the arbor assembly.

The jacks 67 are then operated to raise the arbor lift arms 65 until the pins 73 can be inserted to lock the arms in their upper or lifted position. Reel 62 is now clear of the ground and can be turned on shaft 91 and slid axially thereon to engage the register pins 95 in the winding holes 96 of the reel. Collar 104 is then locked in place to hold the reel against the registry member 93 and the lagging is removed from the reel.

The front anchor legs 107 are then lowered and, at the point where each touches the ground, a hole is dug about 6 to 8 inches deep. The feet 108 are attached and the legs jammed into the excavations. Collars 110 are then locked and the machine 20 is solidly anchored in place.

A soft rope is next threaded through rollers 105, over the top of bull wheel 33 in the first groove thereof, down around bull wheel 34 in the first groove thereof, back up around wheel 33 in the second groove, down around bull wheel 34 in its second groove—and so on, in a spiral path with the two bull wheels at the center. The four grooves of the lower bull wheel 34 are aligned between the five grooves of the upper wheel 33 to form this spiral path with the least possible distortion of the cable short of providing spiral grooves on the bull wheels. The lead end of the rope will emerge heading forward in the last groove on top of bull wheel 33. The trailing end of the rope is then attached to the cable 63 by a Kellems device, or other means, and the lead end attached to a truck, for pulling the cable over the bull wheels, the Kellems device being wrapped to protect the bull wheel grooves.

The lead end of cable 63, now wrapped around the bull wheels, is attached to a wire rope which has already been strung over the pulleys on the towers. The winch truck pulling the wire rope is then signalled, and the shut off valve 57 on the tensioning machine is closed until the wire rope is drawn off the ground ore to the desired height. Valve 57 may then be again opened and regulator valve 56 gradually opened as the pressure indicated on gauge 59 increases.

By observing the cable as it pays out, or by observation of the pressure gauge in the light of previous experience under similar conditions, an operator can regulate valve 56 to maintain a constant tension on the cable as long as the pulling machine winch winds in the wire rope at a steady speed. If for any reason the winch must stop, shut off valve 57 can be closed to lock the bull wheels without disturbing the adjustment of regulator valve 56. The normally closed shut off valve 60 in bypass line 58 may be opened during the initial winding of the cable about the bull wheels to free the bull wheels without disturbing the regulator valve 56.

The bull wheels grip the cable by friction and their aluminum grooves conform to the circular cross section of the cable so they do not mar the surface of the cable. It should be noted that the arbor brake 97 is tensioned at 103 only to provide sufficient drag on the reel 62 to keep the cable 63 in the bull wheel grooves, and not to exert braking action on the towed cable forward of the bull wheels. Whatever braking action this drag brake produces is negligible in proportion to that exerted by the pumps 46.

The chain drive between each bull wheel and its pump has two reduction steps with a total ratio of 65 to one. Thus, as the towed cable turns the bull wheels, the pumps 46 are driven at 65 times the speed of the bull wheels. This provides back pressure in the hydraulic system that can be regulated by the simple manual operation of valve 56 to permit more precise braking action than is possible with ordinary friction brakes connected to the bull wheels. No separate power or motor means is required to operate the brake control means 56.

The amount of tension applied to the bull wheels is in direct proportion to the speed at which the pumps are turning and the amount of fluid being allowed to pass through valve 56. The number of pounds pull is therefore directly proportional to the pressure reading on gauge 59 and, at a constant pulling speed, the correct adjustment of valve 56 can be quickly found.

Furthermore, the hydraulic brake means 46 provides tensioning force without the concentration of high heat as in the case of ordinary friction brakes. Some heat is generated in the pumps at high tensions on the cable, but the pumps 46 are self cooling and a fifty gallon capacity reservoir 53 has been found adequate to provide for the dissipation of the heat generated at the highest tensions. Moreover, the hydraulic brake means 46 provides smooth braking action without possibility of any chattering which is so common in friction brakes.

With the elimination of high heat, the necessity for frequent replacement of parts is also eliminated. Economies are effected as well, in that highly trained brake mechanics are not needed for maintenance, and fewer parts are involved with consequent reduction in manufacturing costs. Moreover, the hydraulic brakes 46 are not as readily affected by weather changes as are friction brakes.

The high pressure on the grooves of the bull wheels necessarily causes rapid wear in the grooves, particularly the grooves near the cable exiting end. The construction of bull wheels 33 and 34, made up of individual identical sheaves 35 bolted together, effects considerable savings in time and expense, in that individual sheaves 35 may be replaced in the field by the operating or maintenance crew. Complete replacement bull wheels need not be carried, nor need the wheels be returned to the factory for regrinding. The simple bolted construction of the wheels permits easy replacement of worn parts, and no specialists such as welders or riveters are required. The chain and sprocket connections between the bull wheels and the pumps are correspondingly simple and worn parts are easily replaced.

The provision of the arbor device 80 at the rear of the tensioning machine eliminates the need for cranes or other lifting devices or special vehicles at the unreeling site. The cable supply reels may be carred on simple trailers just clear of the ground, and the tensioning machine is fully self loading even to the extent that the reel may be leveled on its arbor independent of the leveling of the machine itself and reels of many different sizes may be used.

As will be apparent to those familiar with the art, the invention may be embodied in other specific forms without departing from the spirit or essential characteristics thereof. The embodiment disclosed is therefore to be considered in all respects as illustrative rather than restrictive, the scope of the invention being indicated by the appended claims.

What is claimed is:

1. An apparatus for stringing heavy transmission cable from reels upon which it is wound to towers over which one end of said cable is pulled, comprising: a mobile frame structure; a pair of spaced parallel shafts journalled in said frame; a sheaved bull wheel on each shaft; an arbor adjustably supported in said frame for rotatably supporting a reel supplying cable to said bull wheels; the sheave grooves of one bull wheel being offset one-half sheave groove relative to the sheave grooves of the other bull wheel whereby said bull wheels are adapted to guide the cable in a spiral path therearound and be driven by the cable as it is pulled from the apparatus; a pump driven by each of said bull wheels, each pump having an inlet and an outlet; conduit means connecting said inlets and outlets to a reservoir of hydraulic fluid; and a regulator valve in said conduit means between the outlets of said pumps and said reservoir whereby said pumps may be throttled to brake the rotation of said bull wheels.

2. An apparatus for stringing heavy transmission cable from reels upon which it is wound to towers over which one end of the cable is pulled, comprising: a mobile frame structure; adjustable legs for supporting said frame and anchoring it in place; a pair of spaced parallel shafts journalled in said frame; a group of sheaves rotatably supported on each of said shafts; means connecting the sheaves in each group to one another; a pair of gear pumps mounted on said frame; means for driving each pump from one of said group of sheaves; said pumps being connected in parallel in a closed hydraulic system; a hydraulic fluid reservoir in said system; a regulator valve in said system between the pressure side of said pumps and said reservoir whereby the flow of fluid in said system may be restricted; an arbor adjustably mounted on said frame for rotatably supporting a reel wound with cable; jack means under said arbor for lifting the reel clear of the ground; and drag brake means on said arbor for retarding the rotation of the reel; whereby cable led from the reel in a spiral path over the sheaves is supplied with tension by the pumps as the cable is pulled over the towers.

3. An apparatus for stringing heavy transmission cable from reels upon which it is wound to towers over which one end of the cable is pulled, comprising: a frame structure having supporting legs including a pair of legs at an angle to the vertical for anchoring said frame; an arbor on said frame for rotatably supporting a reel; a pair of shafts journalled in said frame and spaced one above the other; a bull wheel on each shaft, each bull wheel comprising a plurality of sheaves and a disc member rigidly connected together, the sheave grooves of the lower bull wheel being offset one-half sheave groove relative to the sheave grooves on the upper bull wheel whereby cable let from said reel around said upper and lower bull wheels follows a spiral path and operates to drive the bull wheels as it is pulled from the apparatus; a sprocket spaced from and secured to each disc; an idler shaft journalled on said frame adjacent and parallel to said bull wheel shafts; two coupled pairs of independently rotatable sprockets on said idler shaft; a pair of gear pumps mounted on said frame; a drive sprocket for each pump; chain means operatively connecting one of each coupled pair of sprockets to one of said disc mounted sprockets and the other of each coupled pair of sprockets to one of said pump drive sprockets; said pumps being included in a closed hydraulic system; a hydraulic fluid reservoir in said system; and regulator means in said system between the pressure side of said pumps and said reservoir whereby the flow of fluid in said system may be restricted to retard the turning of said bull wheels.

4. A tensioning machine for use in the stringing of heavy transmission cables from a reel on which said line is wound to transmisison towers over which one end of said cable is pulled, comprising: a mobile frame adapted to be anchored in a preselected position relative to one of said transmission towers; a plurality of sheaved bull wheels rotatably mounted on spaced parallel shafts journalled in said frame, the sheaves of said bull wheels being adapted to frictionally engage the cable from said reel wound in a spiral path about said bull wheels; a closed hydraulic system including pump means, said pump means being operatively connected to said bull wheels to be driven by the rotation of the wheels; a regulator valve in said closed system for restricting the flow of fluid in the system to retard the rotation of said bull wheels; an arbor for rotatably supporting a cable supplying reel; an arbor supporting structure hingedly connected to said frame for limited vertical movement with respect thereto, said arbor supporting structure including arbor journals at either end of said arbor, said arbor journals being independently and selectively positionable vertically in said arbor supporting structure for leveling the arbor in said frame; jack means between said fame and said arbor supporting structure for raising said reel from the ground; a reel engaging member secured on said arbor; and drag brake means on said arbor for retarding the rotation of said reel.

5. In a tensioning machine fo use in the stringing of transmission cable from a reel on which the cable is wound: sheaved bull wheels for frictionally engaging the cable as it is pulled from the machine; a frame supporting said bull wheels for rotation thereon and adapted to be anchored in place upon the ground; a closed hydraulic system mounted on said frame, said system including pump means and means for driving the pump means by said bull wheels; a regulator valve in said system for restricting the flow of fluid therein to provide a brake for the bull wheels; a reel arbor supporting arm on each side of said frame, one end of each arm being hingedly secured to the frame; jack means for raising the free end of each arm above said frame; an arbor journal selectively positionable at the outer end of each arm; an arbor for supporting a reel, said arbor being removably supported in said journals; a drum secured to said arbor; a brake band secured to said frame and frictionally engaging said drum; and a reel engaging member secured to said arbor, whereby rotation of said reel is restricted by said brake band and drum to prevent slack cable from feeding on to the bull wheels.

6. A cable supply holder for use on a cable tensioning device, said cable being wound on reels having a central axial hole and radially offset winding holes, comprising: a frame having legs adapted to rest on the ground and to anchor the frame in place; spaced arbor supporting arms secured to said frame; means on said frame for raising the outer ends of said arms; means for securing said arms in raised position, arbor journals adjustably mounted on said outer ends of said arms; means for selectively adjusting said journals in a substantially vertical direction on said arms; and a removable arbor rotatably carried by said journals and adapted to be passed through the central axial hole of a reel; whereby a reel may be rolled between said arms, said journals may then be vertically aligned on said arms with the axial hole in the reel, the removable arbor then inserted and levelled, and said arms may then be raised and locked to rotatably support the reel free of the ground.

7. The reel support of claim 6, having a reel engaging member secured to said arbor, said member having at least one transversely extending pin adjustably secured thereon, said pin being movable on said member radially of said arbor and adapted to engage one of the radially offset reel winding holes, said arbor and one of said arbor support arms having cooperating brake drum and shoe means mounted thereon for restricting rotation of the reel.

8. A reel support for use on a cable tensioning machine, comprising: a frame having legs adapted to support and anchor said machine in place; an arbor supporting arm on each side of said frame, each arm having its inner end hingedly secured to the frame and its free outer end movable upwardly from said frame; guide bars secured to the frame on either side of each arm for guiding said arms for parallel vertical movement; a jack between the frame and the outer end of each arm for raising the arms above the frame; an arm locking pin adapted to be inserted in aligned holes in each arm and its guide bars for holding said arms in raised position; an arbor journal mounted at the outer end of each arm for substantially vertical sliding movement thereon; each journal having a nut secured thereto, and each arm having a vertically disposed worm rotatably secured therein engaging said nut for vertically positioning said journal; a stub shaft rotatably mounted in one of said journals and having an enlarged socket at one end facing the other journal; brake means on said stub shaft and its supporting arm; a reel engaging member secured to said enlarged socket; an arbor for supporting a reel, said arbor being supported by said other journal at one end and engaged with said socket at its other end; and an arbor locking pin engaged in aligned holes in said arbor and socket.

References Cited in the file of this patent

UNITED STATES PATENTS

| | | |
|---|---|---|
| 1,499,500 | Bloss | July 1, 1924 |
| 1,600,098 | Crumley | Sept. 14, 1926 |
| 1,821,178 | Fisher | Sept. 1, 1931 |
| 2,250,269 | Lockwood | July 22, 1941 |
| 2,490,685 | Greene | Dec. 6, 1949 |
| 2,813,601 | De Bourgues | Nov. 19, 1957 |
| 2,948,483 | Petersen | Aug. 9, 1960 |
| 2,991,024 | Goode | July 4, 1961 |